Figure 1:
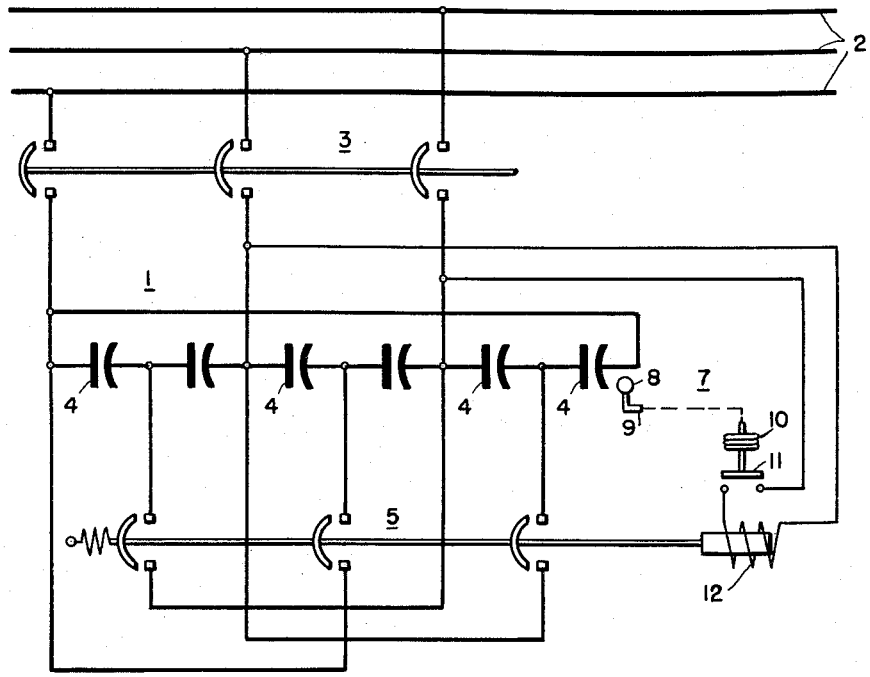

Nov. 1, 1955  R. E. MARBURY  2,722,656

SHUNT CAPACITOR BANK FOR LOW TEMPERATURE OPERATION

Filed Feb. 26, 1953

WITNESSES:

INVENTOR
Ralph E. Marbury.
BY
ATTORNEY

United States Patent Office 2,722,656
Patented Nov. 1, 1955

2,722,656

SHUNT CAPACITOR BANK FOR LOW TEMPERATURE OPERATION

Ralph E. Marbury, Pittsburgh, Pa., assignor to Westinghouse Electric Corporation, East Pittsburgh, Pa., a corporation of Pennsylvania Application February 26, 1953, Serial No. 339,067

10 Claims. (Cl. 323—122)

The present invention relates to shunt capacitor banks and, more particularly, to capacitor banks for operation in locations where very low ambient temperatures may occur.

Power capacitor units, such as are used in shunt capacitor banks for power factor correction, consist of wound capacitor sections of interleaved metal foil and paper, enclosed in a case and impregnated with a dielectric liquid, which is usually a synthetic hydrocarbon, such as chlorinated diphenyl. The dielectric or breakdown strength of impregnants of this type is not materially affected by change in temperature within the normal range of operating temperatures. At very low temperatures, however, a considerable decrease in dielectric strength is likely to occur. When the capacitor is cooled to a very low temperature, the liquid solidifies and contracts, tending to form small voids in the minute spaces between the foil and the paper, and between the fibers of the paper itself. If voltage is applied to the capacitor when in this condition, corona discharges may occur in these voids, causing deterioration of the paper and impregnant and resulting in rapid breakdown and failure of the capacitor. This process of void formation and corona discharge appears to be of a random nature, but the probability of its occurrence increases very rapidly as the temperature of the capacitor decreases. With the standard liquid impregnant usually used, there is little danger of dielectric failure of this type if the temperature of the capacitor does not fall below about —26° C. (—15° F.), but below that temperature failures become increasingly likely. Special low temperature impregnants are available, but the same phenomenon of void formation and corona discharge occurs in these impregnants, although at a lower temperature, and even with these low temperature liquids, dielectric failures are likely if the capacitor temperature falls below about —40° C.

When a capacitor is continuously energized, the losses in the capacitor generate sufficient heat to keep the temperature of the capacitor within the normal operating range, even though the ambient temperature may be extremely low, and there is no danger of dielectric failure if the capacitor is maintained continuously energized. When capacitors are not continuously energized, however, and are subjected to low ambient temperatures, there is considerable risk of dielectric failure. This will be the case, for example, if the capacitors are installed outdoors in a location where severe winter weather conditions prevail and very low temperatures may occur, and if they are not continuously energized, as in the case of capacitor banks which are automatically switched on and off in accordance with line voltage or load conditions, or which are regularly disconnected from the line for extended periods, such as overnight or on week ends. Under such conditions, if the capacitor bank is deenergized for a long enough time for the capacitors to cool down to the ambient temperature, dielectric failures are likely to occur upon re-energization during periods of extremely low temperature. Heaters may be used in housed capacitor banks to maintain the temperature at a safe value, but this is undesirable because of the cost and the continuous consumption of energy in the heaters, and heaters cannot be used, of course, when the capacitors are installed in open racks.

It has been found that if a capacitor is energized at a reduced voltage, such as one-half the normal voltage, so that the voltage stress in the capacitor is very much below the normal voltage stress, dielectric failure does not occur even at very low temperatures. When energized in this manner at low voltage, the loss in the capacitor tends to be somewhat higher than normal, and the heat generated by the loss rapidly warms the capacitor to a temperature at which full voltage can safely be applied, after which the normal loss keeps the capacitor within the safe temperature range. Thus, the danger of dielectric failure at low temperatures can be avoided by energizing the capacitors at reduced voltage and applying full voltage only after the capacitor temperature has increased to a safe value. This change in voltage on the capacitor might be accomplished by means of a transformer with suitable switching means for initially applying a reduced voltage and for later increasing the voltage to normal, but such an arrangement would be quite expensive and would be no more desirable than the use of heaters because of the cost involved.

The principal object of the present invention is to provide a simple and inexpensive means for preventing dielectric failure when capacitors are energized at low temperatures.

Another object of the invention is to provide a simple and inexpensive means for energizing capacitors at a reduced voltage when the temperature of the capacitors is below a predetermined value, and for increasing the voltage to its normal value when the capacitors have heated to a safe temperature.

Still another object of the invention is to provide a capacitor bank arranged to be readily reconnected for applying either a reduced voltage or full normal voltage to the capacitors.

A further object of the invention is to provide a capacitor bank arranged to be initially connected to energize the capacitors at a reduced voltage and to be reconnected to apply full voltage to the capacitors, with simple thermostatically controlled switching means for effecting the reconnection of the bank in response to the temperature of the capacitors.

Figure 2:
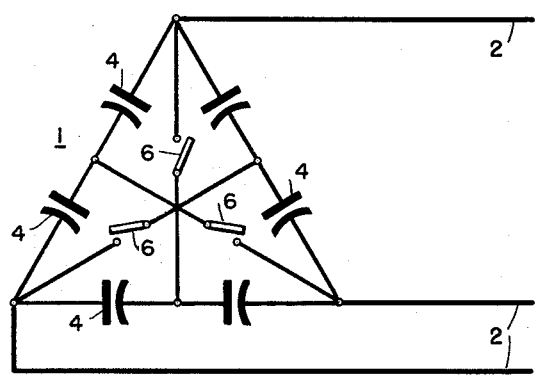

Other objects and advantages of the invention will be apparent from the following detailed description, taken in connection with the accompanying drawing, in which:

Figure 1 is a schematic wiring diagram showing a capacitor bank embodying the invention; and Fig. 2 is a simplified circuit diagram showing the connections of the capacitor bank.

The invention is illustrated in the drawing embodied in a three-phase capacitor bank 1 connected to a three-phase line 2 by means of a main circuit breaker 3, which may be of any suitable type and which may be controlled either manually or automatically in any desired manner. The capacitor bank 1 consists of a plurality of capacitors 4, which are shown as being connected in delta with two capacitors in series in each side of the delta. It will be understood that although the capacitors 4 have been shown diagrammatically as single capacitors, each of the capacitors 4 will usually consist of a number of individual capacitor units connected together in parallel or series-parallel to obtain the desired capacitance and current capacity, and the term "capacitor," as used herein, is to be understood as including any suitable number of individual capacitor units connected together, as well as a single unit.

The capacitor bank 1, as stated, consists of a plurality of delta-connected capacitors, with two capacitors in series in each side of the delta, so that when the bank is connected to the line 2 a voltage equal to one-half the line-to-line voltage is applied to each capacitor. Switching means are provided for reconnecting the bank to apply full line voltage to each capacitor. The switching means may be a simple three-pole circuit breaker 5, as shown in Fig. 1, or it may consist of three single-pole switches or contactors, as shown in the simplified diagram of Fig. 2. In either case, the circuit breaker or switches are connected so that when they close, a conection is completed between each corner of the delta and the mid-point of the opposite side. It will be evident that the effect of this connection is to change the bank from a series-delta to a parallel-delta connection with each capacitor connected directly across the line. Thus, when the circuit breaker 5 or switches 6 are closed, full line voltage is applied to the capacitors.

The switching means is preferably controlled thermostatically in accordance with the temperature of the capacitors. For this purpose, a thermostatic relay 7 is shown in Fig. 1. The relay 7 may be of any suitable type, and is shown as comprising a bulb 8 connected by tubing 9 to a bellows 10 which actuates contacts 11. The bulb 8 contains a volatile fluid which vaporizes and expands the bellows 10 to close the contacts 11 when the temperature of the bulb exceeds a predetermined value. The bulb 8 is positioned to respond to the temperature of one of the capacitors 4, preferably being placed in contact with the case of one of the capacitor units, and when the contacts 11 close, an energizing circuit is completed from the line 2 to the operating coil 12 of the circuit breaker 5. It will be evident that the relay 7 could be utilized in the same manner to control individual coils for the three single-pole switches of Fig. 2. Any suitable type of thermally-responsive relay can, of course, be utilized, and any desired type of circuit breaker or switching means can be employed to effect the reconnection of the capacitor bank.

When the main circuit breaker 3 is closed to connect the capacitor bank 1 to the line 2, the capacitors 4 are connected to the line in the series-delta connection, so that each capacitor is subjected to one-half the line voltage. If the temperature of the capacitors at this time is below the safe value for which the relay 7 is set, which may, for example, be —26° C., the circuit breaker 5 or switches 6 will remain open, and since the capacitors are thus energized on reduced voltage, there is no danger of dielectric failure, as previously explained. The losses in the capacitors 4 on reduced voltage tend to be somewhat higher than the normal losses, and the heat generated in the capacitors by the losses will rapidly warm them to a safe temperature. When the temperature of the capacitors has reached this value, the relay 7 closes the contacts 11 to energize the coil 12 of the circuit breaker 5 so that the breaker is closed to effect reconnection of the bank with full voltage applied to the capacitors. The normal losses in the capacitors generate sufficient heat to keep them in the safe temperature range, so that the circuit breaker 5 is held closed and the capacitors operate in the normal manner at full voltage. If the capacitors are still warm from previous operation at the time the circuit breaker 3 is closed, or if the ambient temperature is above the safe value, the contacts 11 of the relay 7 will be closed, and the circuit breaker 5 will close as soon as the coil 12 is energized by closure of the main breaker 3, so that full voltage is immediately applied to the capacitors.

It will be seen that a simple and inexpensive means has been provided for safely energizing capacitors at very low temperatures so that no risk of dielectric failure is involved in energizing a capacitor bank, even when it has been deenergized for a long enough time to cool to the ambient temperature. This result is accomplished in a simple and inexpensive manner by reconnecting the bank in the manner described, which can be done by a simple thermostatically controlled switching means.

Since the problem of dielectric failure at low temperatures is usually encountered in connection with capacitor banks which are automatically switched on and off the line, the automatic control itself can be used to effect reconnection of the bank to avoid the danger of dielectric failure, and such an arrangement is within the scope of the invention. Thus, when the capacitors are energized at half normal voltage, the reactive KVA of the capacitor bank is only 25% of its normal value and this will not cause an objectionable rise in line voltage at light loads. If the capacitor bank is automatically switched in accordance with line voltage or load conditions, therefore, or at predetermined times, the automatic control can be used to actuate the circuit breaker 5 or switches 6, so that the capacitor bank is not deenergized but is connected for reduced voltage operation when it is not needed, thus keeping the capacitors warm enough to prevent risk of dielectric failure if the ambient temperature is low. When the automatic control is used in this way, to effect reconnection of the bank rather than disconnecting it, the thermostatic control can usually be eliminated, although if desired, it may also be used to prevent reconnection of the bank for full voltage if the capacitor temperature is dangerously low.

A specific embodiment of the invention has been shown and described for the purpose of illustration, but it will be obvious that many modifications and other embodiments are possible within the scope of the invention, and it is to be understood that the invention is not limited to the specific arrangement shown but includes all equivalent embodiments and modifications.

I claim as my invention:

1. In combination, a plurality of capacitors, means for connecting said capacitors to an alternating current line with the capacitors in series-connected groups, and means responsive to the temperature of the capacitors for effecting reconnection of the capacitors in parallel-connected groups when said temperature exceeds a predetermined value.

2. In combination, a plurality of capacitors, means for connecting said capacitors across an alternating current line in groups of two series-connected capacitors, and means responsive to the temperature of the capacitors for effecting reconnection of the capacitors with each capacitor directly across the line when said temperature exceeds a predetermined value.

3. In combination, a plurality of capacitors, means for connecting said capacitors to a three-phase alternating current line with two capacitors in series across each phase of the line, and means responsive to the temperature of the capacitors for effecting reconnection of the capacitors with each capacitor directly across the line when said temperature exceeds a predetermined value.

4. In combination, a plurality of capacitors, means for connecting said capacitors to a three-phase alternating current line with two capacitors in series across each phase of the line, and means responsive to the temperature of the capacitors for effecting reconnection of the capacitors in parallel-connected groups when said temperature exceeds a predetermined value.

5. A three-phase capacitor bank comprising a plurality of capacitors connected in delta with two capacitors in series in each side of the delta, and means responsive to the temperature of the capacitors for effecting reconnection of the bank in a parallel delta connection when said temperature exceeds a predetermined value.

6. A three-phase capacitor bank comprising a plurality of capacitors connected in delta with two capacitors in series in each side of the delta, and means responsive to the temperature of the capacitors for effecting connection of each corner of the delta to the mid-point of the opposite side when said temperature exceeds a predetermined value.

7. A three-phase capacitor bank comprising a plurality of capacitors connected in delta with two capacitors in series in each side of the delta, switching means for connecting each corner of the delta to the mid-point of the opposite side, and temperature-responsive means for effecting actuation of said switching means to complete said connection when the temperature of the capacitors exceeds a predetermined value.

8. A three-phase capacitor bank comprising a plurality of capacitors connected in delta with two capacitors in series in each side of the delta, switching means for connecting each corner of the delta to the mid-point of the opposite side, and temperature-responsive relay means responsive to the temperature of one of the capacitors for effecting actuation of said switching means to closed position when said temperature exceeds a predetermined value.

9. A three-phase capacitor bank comprising a plurality of capacitors connected in delta with two capacitors in series in each side of the delta, and automatic means for effecting connection of each corner of the delta to the midpoint of the opposite side in response to a predetermined condition.

10. A three-phase capacitor bank comprising a plurality of capacitors connected in delta with two capacitors in series in each side of the delta, switching means for effecting connection of each corner of the delta to the midpoint of the opposite side, and automatic means for effecting actuation of the switching means in response to a predetermined condition.

References Cited in the file of this patent

UNITED STATES PATENTS 2,317,642    Robinson _____ Apr. 27, 1943